(12) United States Patent
Gupta et al.

(10) Patent No.: US 7,733,484 B1
(45) Date of Patent: Jun. 8, 2010

(54) HYPERSPECTRAL SCENE PROJECTION/GENERATION SYSTEMS AND METHODS

(75) Inventors: Neelam Gupta, Bethesda, MD (US); Ronald G. Driggers, Davidsonville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 619 days.

(21) Appl. No.: 11/239,460

(22) Filed: Sep. 26, 2005

(51) Int. Cl.
*G01J 3/28* (2006.01)
(52) U.S. Cl. ...................................... 356/326
(58) Field of Classification Search .............. 356/326, 356/300, 331
See application file for complete search history.

(56) References Cited

U.S. PATENT DOCUMENTS

| | | | | |
|---|---|---|---|---|
| 4,705,396 A | * | 11/1987 | Bergstrom | ........... 356/332 |
| 5,734,931 A | * | 3/1998 | Inoue et al. | ........... 396/52 |
| RE36,529 E | * | 1/2000 | Lewis et al. | ........... 356/301 |
| 6,485,150 B1 | | 11/2002 | Driggers et al. | ........... 359/615 |
| 6,490,075 B1 | * | 12/2002 | Scheps et al. | ........... 356/300 |
| 7,106,435 B2 | * | 9/2006 | Nelson | ........... 356/300 |
| 7,199,876 B2 | * | 4/2007 | Mitchell | ........... 356/328 |
| 2001/0052979 A1 | * | 12/2001 | Treado et al. | ........... 356/326 |
| 2002/0052979 A1 | * | 5/2002 | Kappel et al. | ........... 709/315 |
| 2002/0057431 A1 | * | 5/2002 | Fateley et al. | ........... 356/330 |

OTHER PUBLICATIONS

Chieu Tran "Acousto-Optic Devices Optical Elements for Spectroscopy" 1992, Analytical Chemistry, vol. 64, No. 20, 971A-981A.*

* cited by examiner

*Primary Examiner*—Kara E Geisel
(74) *Attorney, Agent, or Firm*—Edward L. Stolarun; Guy M. Miller; Lawrence E. Anderson

(57) ABSTRACT

Embodiments of hyperspectral scene projection/generation systems and methods are disclosed. One method embodiment, among others, comprises dispersing a beam of light at one of a plurality of selectable wavelengths, the beam of light corresponding to a scene, and displaying a spectral image of the scene corresponding to the dispersed beam of light at one of the plurality of selectable wavelengths.

18 Claims, 8 Drawing Sheets

HYPERSPECTRAL SCENE PROJECTION/GENERATION SYSTEMS AND METHODS

GOVERNMENT INTEREST

The invention described herein may be manufactured, used, and licensed by or for the United States Government.

BACKGROUND

1. Technical Field

The present disclosure is generally related to scene projection/generation systems and methods and, more particularly, is related to hyperspectral scene projection/generation systems and methods.

2. Description of the Related Art

Hyperspectral scene projection/generation systems can be used for projection and generation of hyperspectral scenes, which provide, among other benefits, insight into the ability to detect and identify minerals, terrestrial vegetation, and man-made materials and backgrounds at various wavelengths. Actual detection of materials may be dependent on the spectral coverage, spectral resolution, and signal-to-noise ratio of the system, in addition to the abundance of the material and the strength of absorption features for that material in the wavelength region of interest.

Current hyperspectral scene projection/generation systems typically comprise traditional dispersive elements, such as gratings and prisms, that are rotated and/or moved over a defined period of time in order to generate a hyperspectral scene. FIGS. 1A-1B illustrate an exemplary hyperspectral scene projection/generation system 10 that comprises imaging elements or imager configured such that there is relative motion between a scene and the imager elements. The hyperspectral scene projection/generation system 10 comprises a light source 12 that generates a scene (e.g., a pixellated, 2-spatial dimensional (2D) triangle as shown) comprising white light that includes a mixture of wavelengths through the use of well-known systems and methods. The scene may comprise any two (or more) spatial dimensional collection of objects that is to be imaged. Such a light source 12 may comprise a pixellated light source, such as an exemplary light source described further in U.S. Pat. No. 6,485,150, herein incorporated by reference. The hyperspectral scene projection/generation system 10 further comprises a slit or thin aperture 14, a grating 16 (or prism), an imaging lens 18, and a display system 20. The display system 20 may be configured as a screen on which an imaged scene may be projected, a camera, and/or a video monitor, among other devices or systems on which an imaged scene may be captured and/or displayed.

The light source 12 provides beams of light corresponding to the generated scene that passes through the slit 14 to the grating 16. All of the colors of the imaged scene, as seen through the slit 14, are diffracted from the grating 16 as it is moved, resulting in the formation of the image of the slit 14 on the display system 20. The display system 20, for example, may comprise a camera or detector array coupled to a digital computer to digitize the image and store it and display it on a video monitor. Since there is relative motion between the scene and the imaging system (e.g., the slit 14, the grating 16, the lens 18 and the display system 20) as a function of time, for example $t_1$-$t_6$ (this relative movement, for example, represented symbolically by the two headed arrow under the scene), a progressively more complete image of the scene (which includes all of the colors of the imaged scene) is displayed on the display system 20 as time progresses. Scene images 22, 24, 26, 28, 30, and 32 are generated at respective times $t_1$, $t_2$, $t_3$, $t_4$, $t_5$, and $t_6$. Each scene image comprises columns, each proportioned to the dimension of the slit 14, of each respective color of the incident white length (e.g., scene). For example, in scene image 22 at time $t_1$, "r" represents the color red at a wavelength ($\lambda_1$), "o" represents the color orange at wavelength ($\lambda_2$), and so on until the color violet ("v") at wavelength ($\lambda_n$). In other words, using a 2-D detector array for the display system 20, one dimension recorded is the spatial dimension of the slit and the other dimension recorded is the wavelength or color due to dispersion. In recording these partial scene images at each time ($t_1$-$t_6$), the position of pixels corresponding to the different colors can be recorded. That is, as shown, different colors are incident on different columns of pixels, so the color information of the scene image has a column association.

Thus, in one exemplary operation, at time $t_1$, a first partial image 22 of the scene is formed on the camera, stored on the computer, the extent of the first partial image generated in proportion to the dimensions of the slit 14 (i.e., a one spatial dimension (herein, 1-D) image). At time $t_2$, a second partial image of the scene is generated, corresponding to another slit dimension to the first image but covering a different portion of the scene due to the movement of the imager. Assuming the display system 20 comprises a camera connected to a digital computer, at a time corresponding to $t_2$, the first partial scene 22 stored in memory of the computer may be combined with the second partial scene 24 during the image cube formation stage, as explained below. This process of relative movement and partial scene image recording continues in ordered sequence from $t_3$, $t_4$, $t_5$, and $t_6$ corresponding to image scenes 26, 28, 30, and 32 (i.e., the wavelengths are in sequential order as a consequence of the diffraction from the grating 16) until the complete scene image covering the entire spectrum is covered.

The left hand side of FIG. 1B shows the series of partial scene images 22-32 generated through the above-described operation shown in FIG. 1A. The right hand side of FIG. 1B illustrates an exemplary process for generating a full image cube 50 of 2-D scene images 52, 54, 56, 58, 60, and 62, each scene image at a respective color of the white light spectrum (versus the partial scene images 22-32, each spanning every color of the white light spectrum). The display system 20 (e.g., computer portion) adds the pixel column values from each partial scene image to generate a full 2-D scene image at the respective color or wavelength. Thus, the result of the computations within the display system 20 is the generation and display of individual, 2-D (-x or -t, and -y), spectral scene images generated at each wavelength ($\lambda_1$, $\lambda_2$, $\lambda_n$), as illustrated by the dimension axis 70. Desired wavelengths of the full-color scene image are then selected to provide the hyperspectral scene projection/generation functionality for individual wavelengths. However, such conventional systems typically require moving parts, large and time-consuming computing requirements (e.g., storing, processing, sorting, etc.) to retrieve a desired spectral scene image, and/or local control. Such systems are also inflexible due at least in part to requiring the collection of each scene image at each wavelength to generate a desired spectral scene image.

SUMMARY

Embodiments of hyperspectral scene projection/generation systems and methods are disclosed. One method embodiment, among others, comprises dispersing a beam of light at one of a plurality of selectable wavelengths, the beam of light corresponding to a scene, and displaying a spectral image of a scene corresponding to the dispersed beam of light at one of the plurality of selectable wavelengths.

One system embodiment, among others, comprises a tunable dispersive device configured to disperse a beam of light at one of a plurality of selectable wavelengths, the beam of light corresponding to a scene, and a display system configured to display a spectral image of a scene corresponding to the dispersed beam of light at one of the plurality of selectable wavelengths.

Other systems, methods, features, and advantages of the present disclosure will be or become apparent to one with skill in the art upon examination of the following drawings and detailed description. It is intended that all such additional systems, methods, features, and advantages be included within this description and be within the scope of the disclosure.

BRIEF DESCRIPTION OF THE DRAWINGS

The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Disclosed herein are various embodiments of hyperspectral scene projection/generation systems and methods, herein referred to as a hyperspectral scene projection/generation system or systems for brevity. Such hyperspectral scene projection/generation systems generate a sequence of images having two or more spatial dimensions, each at a single color, to form an image cube. Thus, at each time interval, a spectral image of a scene is formed, the spectral scene image comprising at least two spatial dimensions and a third dimension corresponding to wavelength (e.g., single wavelength or band of wavelengths corresponding to the respective color of the image). In one implementation, spectral scene images can be recorded on a computer as a function of time until an image cube comprising hyperspectral scene images (a plurality of spectral scene images covering a defined range of colors) is complete. Such a hyperspectral scene projection/generation system can perform more efficiently and with greater speed and flexibility than conventional systems, since full 2-dimensional, spatial image scenes (spectral scene images) are collected for each wavelength, eliminating or reducing computation time and resources and requiring no moving parts. Additionally, in such a hyperspectral scene projection/generation system, wavelengths can be selected (through local or remote control) sequentially or randomly, more than one wavelength can be used, and a user is free to generate as few or as many spectral scene images as the application demands.

In one embodiment, hyperspectral scene projection/generation systems relate a tunable, dispersive device operation to the generation and/or projection of multi-spatial dimension (e.g., 2-spatial dimension or herein, 2-D) spectral scene images at distinct wavelengths, forming an image cube comprising hyperspectral scene images. Certain hyperspectral scene images can be used to simulate how an object behaves in a particular color or spectral wavelength. In one embodiment, a hyperspectral scene projection/generation system comprises a computer-controlled acousto-optic tunable filter that spectrally filters white light produced and processed by a light source and optic system for display of the processed light on a display system.

Figure 2:
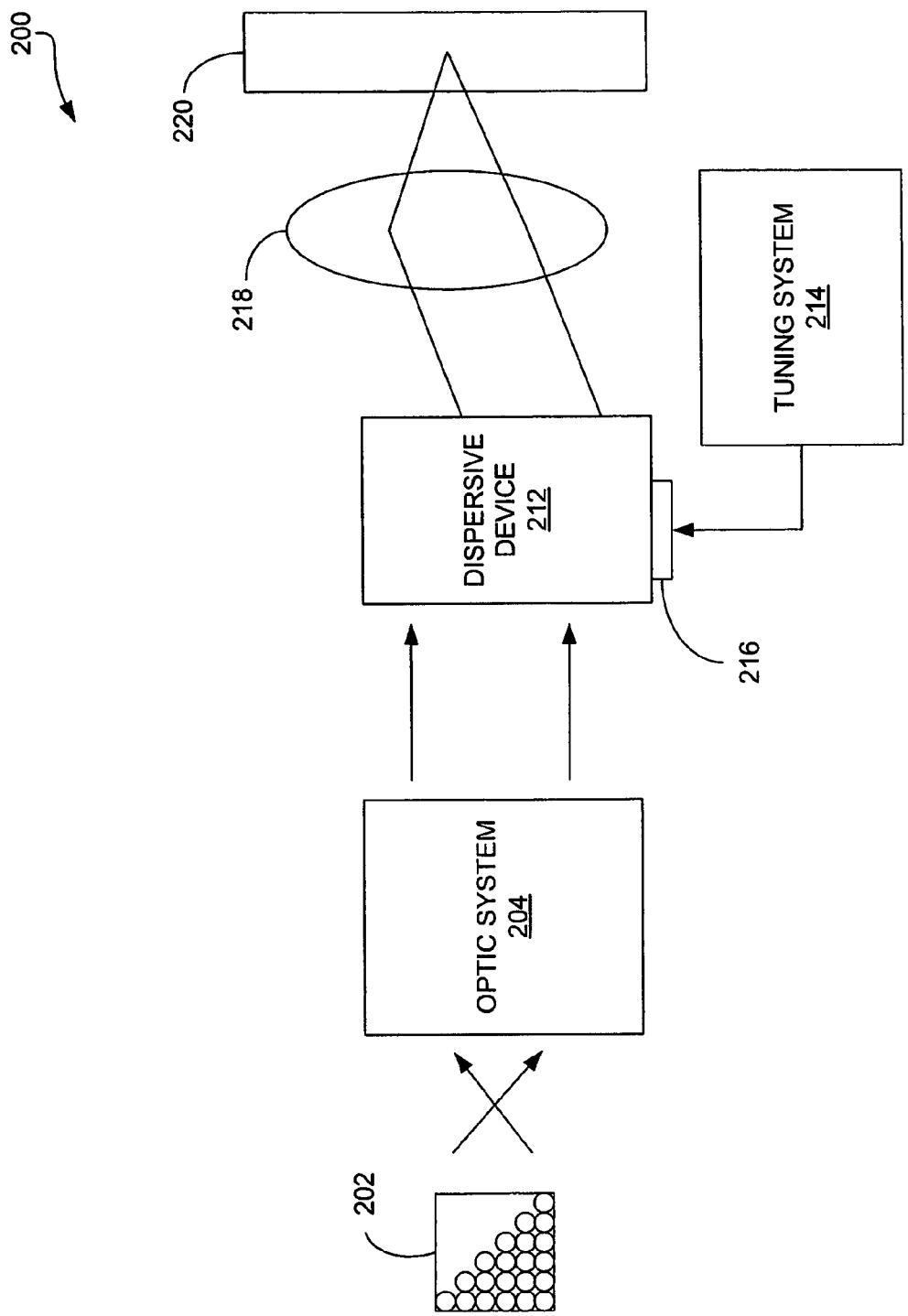
FIG. 2 is a schematic diagram of an embodiment of a hyperspectral scene projection/generation system.

FIG. 2 is a schematic diagram of an embodiment of a hyperspectral scene projection/generation system 200. The hyperspectral scene projection/generation system 200 comprises a pixellated light source 202, an optic system 204, a tunable dispersive device 212, a tuning system 214 that controls the tuning of the dispersive device 212 through a transducer 216, a lens 218, and a display system 220.

The light source 202 can generate a 2-D (or more spatial dimension) scene (e.g., a triangle, shown as one among many possible examples). In one embodiment, the light source 202 can comprise a two-dimensional pixellated broadband light source, which covers the electromagnetic spectrum from ultraviolet (UV) to infrared (IR). In some embodiments, a light source can be used where only a portion of the UV to IR range is covered or a different electromagnetic range is covered. Each pixel light source can be individually controlled to adjust how much light it emits. The light source 202 can be a white light source with a 2-D screen having holes in it, wherein the aperture of each hole can be individually controlled. Other configurations for the light source 202 can be used, including a 2-D resistor array of elements, where each element can be heated under individual control to emit infrared light, a micro-mirror device with a 2-D structure, where each mirror can be controlled separately, or light emitting diodes. Regardless of the light source embodiment used, each of the light sources may be operated with or without computer control.

The optic system 204 may comprise one or more filters and lenses. The optic system 204 receives the light from the light source 202, and in one embodiment, collimates the received light. The collimated beam of light is filtered and provided to the dispersive device 212. In some embodiments, non-collimated beams may be generated and processed.

The dispersive device 212 is coupled to the tuning system 214 through a transducer 216. The transducer 216 may be, for example, a thin plate piezoelectric transducer. The tuning system 214 provides an adjustable radio frequency (RF) signal to the transducer 216, which converts the signal to sound waves. The sound waves cause dispersion of the collimated beam provided by the optic system 204, resulting in the production of beams of light at distinct wavelengths. The tuning system 214 may comprise a computer or other processing device, control software, and/or an RF generator. Through application of an adjustable RF signal to the transducer 216 coupled to the dispersive device 212, the wavelength of the spectral image of the scene generated on the display system 220 can be changed. In other words, all the radio frequency change operations can be done seamlessly under computer control, locally or from a remote location. In some embodiments, manual adjustment can be used in addition to or in lieu of automatic control. Further, in response to either manual input or in response to instructions from control software, the tuning system 214 can provide sequential changes or random changes (or a combination of both) to the frequency signal.

In one embodiment, the dispersive device 212 comprises a non-collinear, acousto-optic tunable spectral filter. The dispersive device 212 may also comprise an aperture, among other elements. Other dispersive devices that are tunable and produce regions of high and low density (e.g., compression and rarefaction) to produce a grating (e.g., phase grating) effect based on the tuning signal can be used to obtain images of full 2-D spectral scenes, including liquid crystal light filters, Fabry-Perot interferometers, Michaelson interferometers, or diffractive optical lenses, among other devices.

The light output from the dispersive device 212 at a distinct wavelength passes through the lens 218 (e.g., an iris lens) and is imaged onto and/or in the display system 220. The display system 220 may comprise a projection screen, video monitor, computer, and/or a 2-D detector array (e.g., as provided in a camera). For example, the display system 220 may comprise a charge-coupled device (CCD) camera and a computer. The CCD camera may be coupled to a frame grabber to digitize the analog output of the camera, and the digitized images can be stored on a computer. The operation of the dispersive device 212 and/or display system 220 may be manually operated or automated, or a combination of both forms of control.

It will be understood that the hyperspectral scene projection/generation system 200 illustrated in FIG. 2 provides an overview of an exemplary embodiment of a hyperspectral scene projection/generation system 200, and in some embodiments may include fewer, greater, and/or different components.

Figure 3:
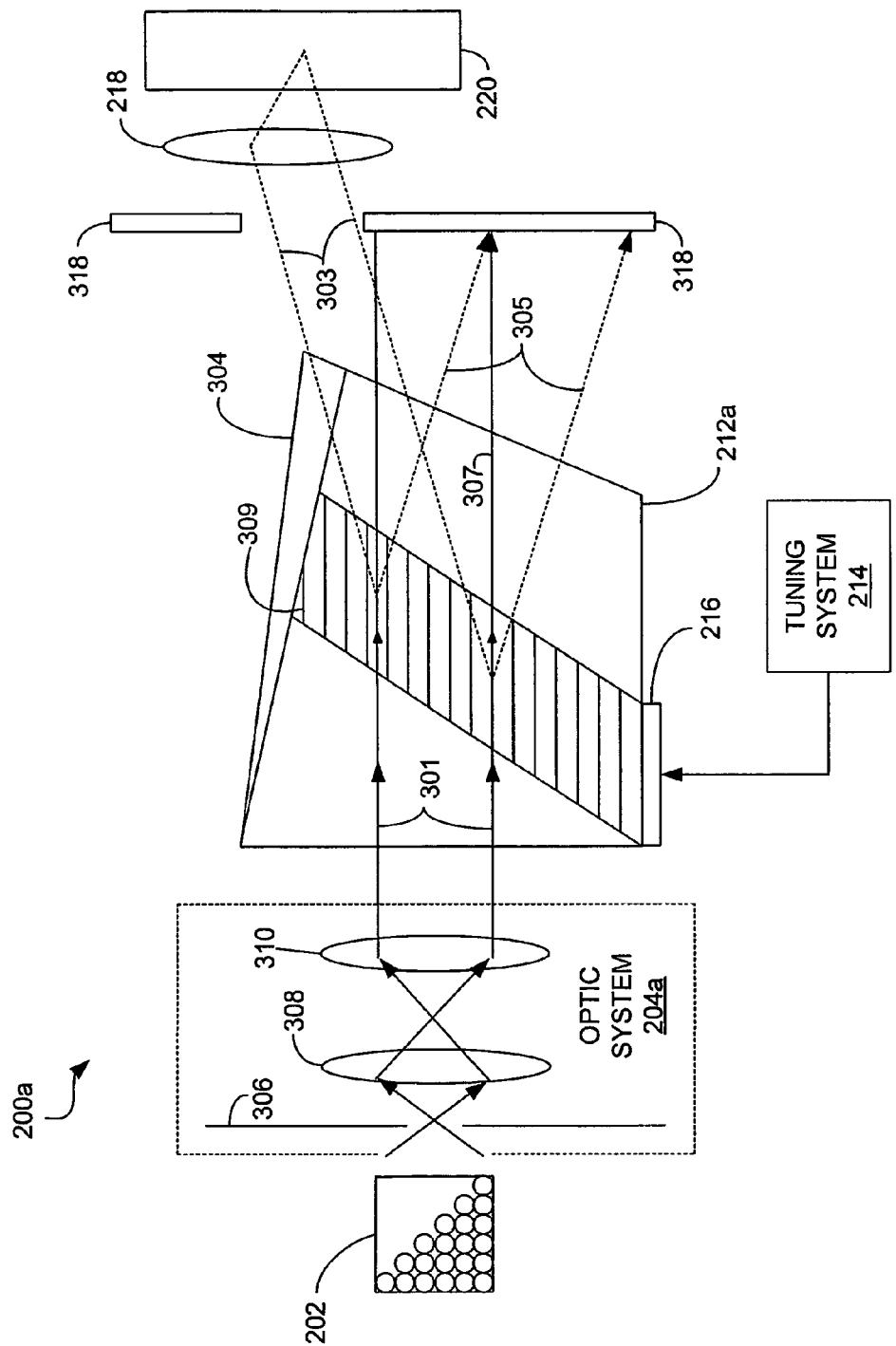
FIG. 3 is a schematic diagram of an embodiment of a hyperspectral scene projection/generation system.

FIG. 3 is a schematic diagram of an embodiment of a hyperspectral scene projection/generation system 200a. The hyperspectral scene projection/generation system 200a comprises a light source 202, an optic system 204a, a dispersive device embodied as an acousto-optic tunable filter 212a, tuning system 214, transducer 216, lens 218, display system 220, and an aperture 318.

The optic system 204a may comprise, in one embodiment, a spatial filter 306 and lenses 308 and 310. The lenses 308 and 310 collimate a light beam provided by the light source 202 and filtered by the spatial filter 306. That is, the light (e.g., scene image) from the light source 202 is incident on the spatial filter 306, which can comprise an aperture or iris. The spatial filter 306 spatially filters the light beam. The spatially filtered beam passes through the lenses 308 and 310 (e.g., configured as two plano convex or convex lenses), providing a collimated beam of a size equal to an input aperture of the acousto-optic tunable filter 212a.

The acousto-optic tunable filter 212a can be comprised of a specially-cut, birefringent crystal prism. The transducer 216 can be bonded on one side of the crystal and an acoustic absorber 304 can be bonded on the opposite facet. One of many different types of crystals may be used in the acousto-optic tunable filter 212a. Such different crystal types can cover various wavelengths included in, for example, the ultraviolet to infrared region. Such crystals may be fabricated in high-purity single crystals of KDP, ADP, quartz, MgF2, TeO2, LiNbO3, TAS, Hg2Cl2, Hg2Br2, etc.

When a radio frequency signal is applied to the transducer 216 from the tuning system 214, it generates an ultrasonic wave that travels through the crystal and is absorbed at the other end by the acoustic absorber 304. The ultrasonic wave is represented in FIG. 3 using lines 309. The traveling sound wave in the crystal creates regions of high and low density, the regions acting like a grating, and thus incident light is diffracted in an anisotropic diffraction process wherein white light can be filtered into different colors of diffracted light based on the applied radio frequency.

There are generally two types of acousto-optic tunable filters: collinear and noncollinear. In a noncollinear filter, incident and diffracted light and acoustic beams do not travel in the same direction. In a collinear filter, the beams travel in the same direction. The diffracted optical wavelength (for collinear or non-collinear filters) is inversely proportional to the applied radio frequency. Thus, the wavelength of the diffracted light can be changed by changing the applied radio frequency.

For a white light collimated incident beam 301 that is incident normal to the input facet of the acousto-optic tunable filter 212a (configured in this illustrated embodiment as a non-collinear filter), at least three beams 303, 305, and 307 come out of the crystal. These include two diffracted beams 303 and 305 at defined angles with respect to the incident beam 301 with orthogonal polarization at a defined wavelength corresponding to the applied radio frequency. The third beam 307 is referred to as a zero-order beam, which contains all the light except the amount that was diffracted at the particular optical wavelengths.

Light output from the acousto-optic tunable filter 212a passes through an aperture 318 external to the acousto-optic tunable filter 212a to pass only one of the diffracted beams 303 and block the other two beams 305 and 307. In some embodiments, such an aperture 318 may be integrated with the acousto-optic tunable filter 212a. The diffracted beam passes through the lens 218 (e.g., an iris lens) and is imaged onto and/or in the display system 220.

In some embodiments, a collinear acousto-optic tunable filter may be used. For a collinear acousto-optic tunable filter, a polarizer may be positioned before the collinear acousto-optic tunable filter and an analyzer may be positioned after the collinear acousto-optic tunable filter. A polarizer and an analyzer can be used to separate the incident light and a zero order beam from a diffracted beam.

The acousto-optic tunable filter 212a (or like-configured dispersive devices) has several features, including no moving parts, the ability to generate a multi-spatial dimension scene image at a defined wavelength (i.e., a spectral image of a scene) at one time without using any motion, the ability to generate a spectral image of a scene by changing the wavelength sequentially or randomly (also locally or remotely), and the ability to generate a complex spectral content scene image by applying multiple radio frequencies to the transducer 216 simultaneously. Another feature of the acousto-optic tunable filter 212a is the ability to generate many spectral frames in a brief period of time (e.g., approximately 100,000 or more spectral frames per second). Further, spectral scene images can be generated at distinct wavelengths of choice instead of generating hundreds of spectral images of a scene to fill an image cube.

Figure 4:
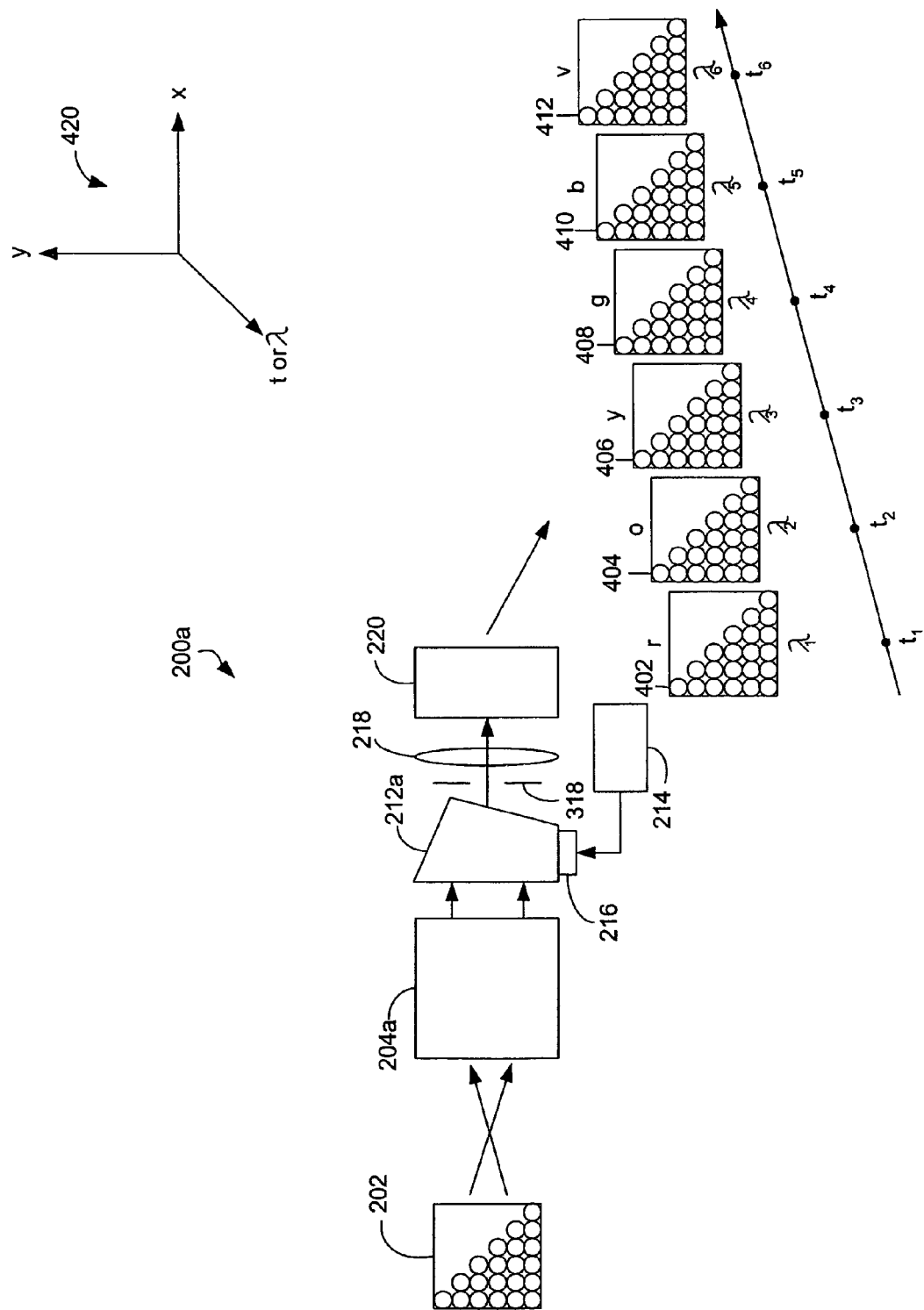
FIG. 4 is a schematic diagram that illustrates how 2-spatial dimension spectral scene images are generated at distinct wavelengths using the tunable hyperspectral scene projection/generation system shown in FIG. 3.

FIG. 4 is a schematic diagram that illustrates how 2-D spectral scene images are generated at distinct wavelengths using the hyperspectral scene projection/generation system 200a shown in FIG. 3. The hyperspectral scene projection/generation system 200a comprises the light source 202, optic system 204a, acousto-optic tunable filter 212a, transducer 216a, tuning system 214, aperture 318, lens 218, and display system 220.

Figure 1A:
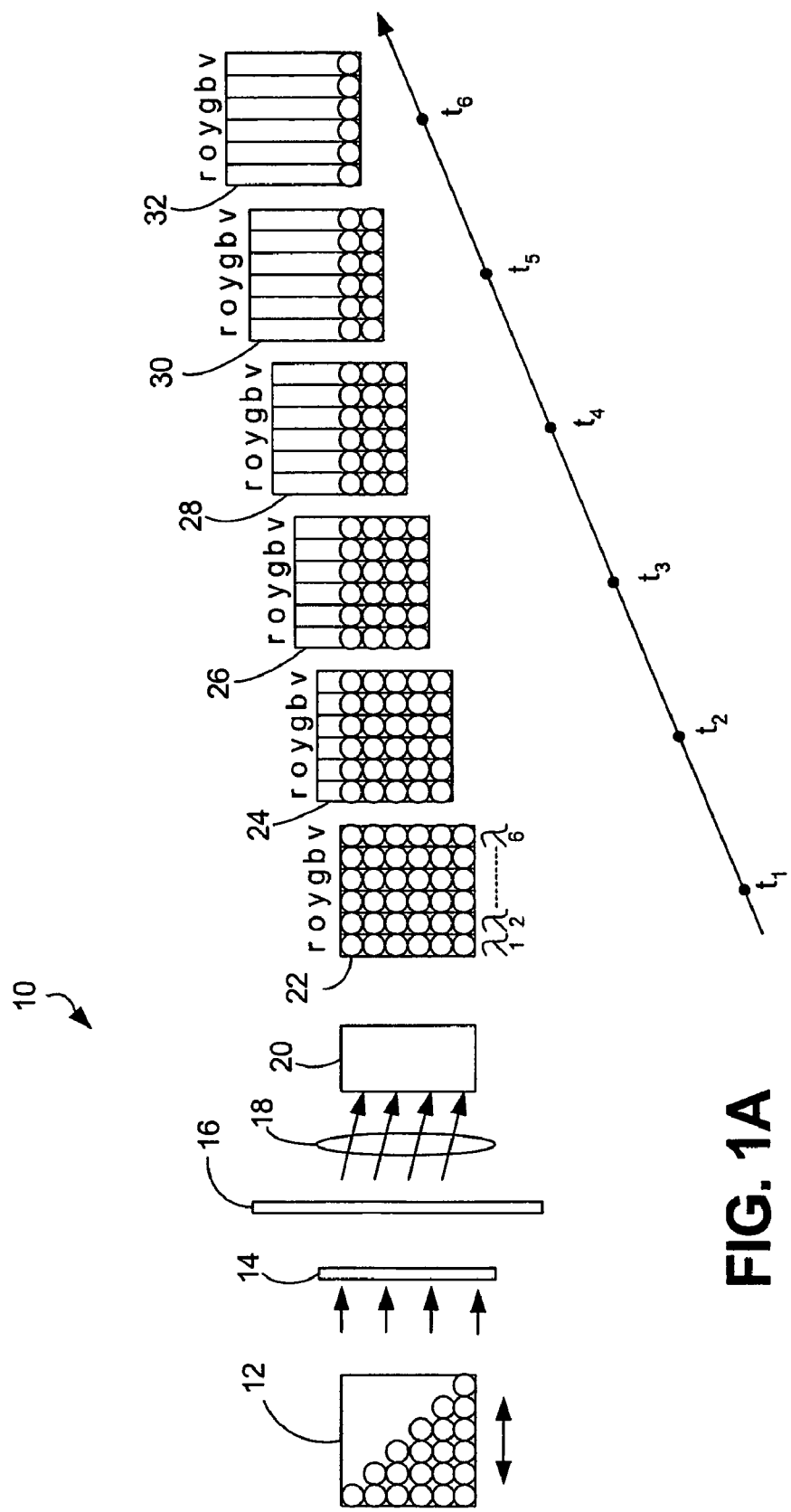
FIGS. 1A-1B are schematic diagrams of a hyperspectral scene projection/generation system that utilizes traditional dispersive elements.
Figure 1B:
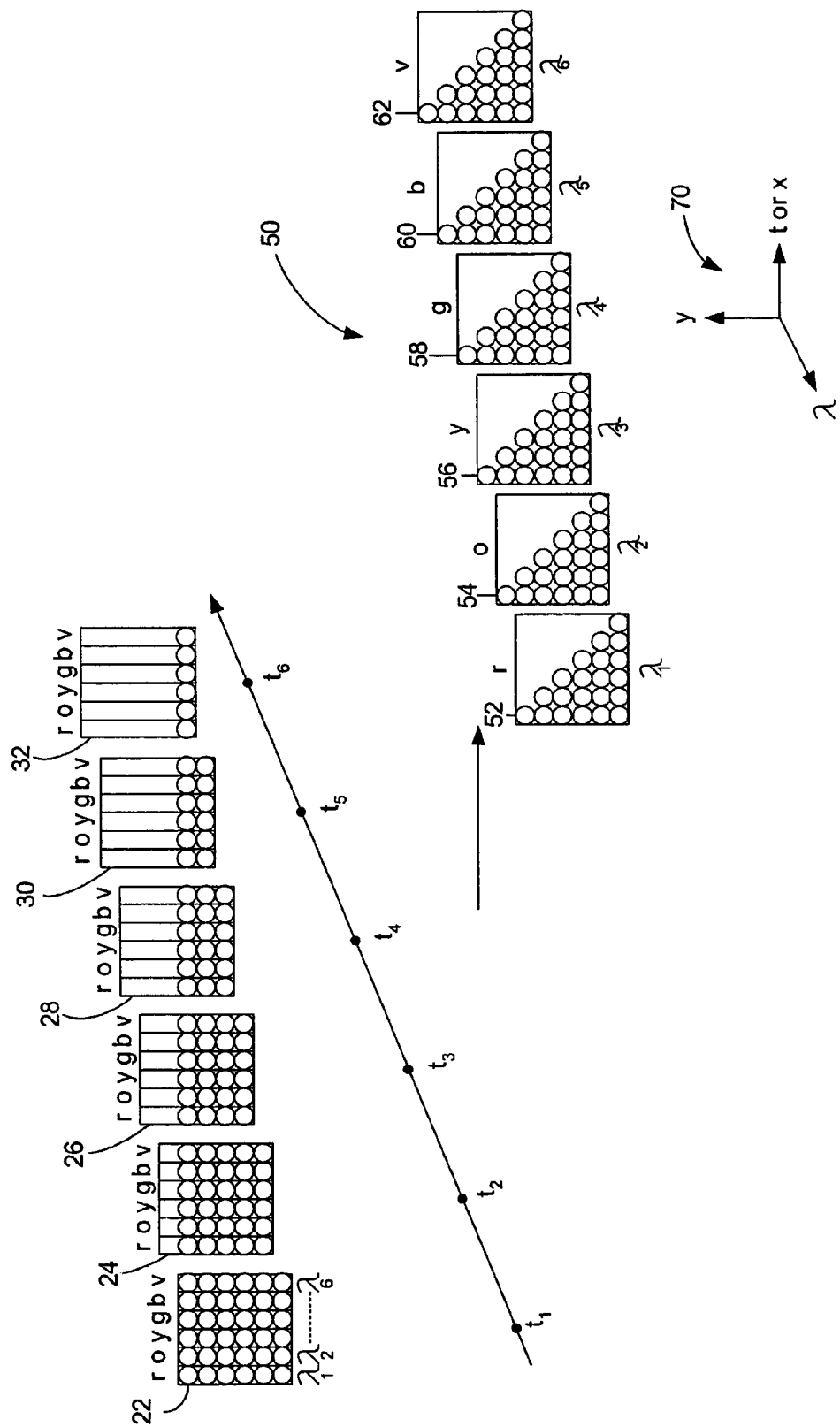

A scene on the pixellated light source may show a variety of things, for example represented as a 2-D triangle (as in FIG. 1A), and is generated by pixellated light source 202. As described above in association with FIG. 2, an incident light beam corresponding to the scene on light source 202 is presented to the optic system 204a, where it is collimated and filtered to provide a light beam to the acousto-optic tunable filter 212a. The acousto-optic tunable filter 212a receives a control signal from the tuning system 214 via the transducer 216 to cause diffraction of the incident light beam. The diffracted beam at a defined wavelength provided by the acousto-optic tunable filter 212a passes through the aperture 318 and lens 218. The lens 218 focuses the resulting beam onto the display system 220.

Two-dimensional spectral scene images 402, 404, 406, 408, 410, and 412 at distinct wavelengths are imaged onto the display system 220. At a first instance of time t1 corresponding to wavelength (λ1), a red ("r") triangle is the displayed, 2-D (-x and -y dimensioned) spectral scene image 402 because the frequency of the control signal provided to the acousto-optic tunable filter 212a (from the tuning system 214 via the transducer 216) causes only the diffracted beam corresponding to the red wavelength (λ1) to reach the display system 220. Similarly, at a second instance in time t2 corresponding to wavelength (λ2), an orange ("o") triangle is the displayed 2-D spectral scene image 404 because the frequency of the control signal provided to the acousto-optic tunable filter 212a (from the tuning system 214 via the transducer 216) causes only the diffracted beam corresponding to the orange wavelength (λ2) to reach the display system 220. Spectral scenes images 406 (yellow ("y") triangle, λ3), 408 (green ("g") triangle, λ4), 410 (blue ("b") triangle, λ5), and 412 (violet ("v") triangle, λ6) at respective instances of time t3, t4, t5, t6, etc. are similarly imaged using the same method. Thus, each image has spatial dimensions of x and y at respective time or wavelength dimensions, as represented by dimension axis 420.

The scene generation change can be performed rapidly. For example, using the acousto-optic tunable filter 212a as an example dispersive device, changes in scene generation can occur in a time equal to the time it takes for the ultrasonic beam to traverse through a crystal of the acousto-optic tunable filter 212a. The amount of time for the ultrasonic beam to traverse a crystal depends on the size of the crystal and the velocity of the sound wave in the defined direction. For example, in a TAS crystal, the acoustic velocity is 100,000 centimeters/second, and thus it takes approximately 10 microseconds for the acoustic wave to traverse a 1 centimeter length of the crystal. At this rate, the acousto-optic tunable filter 212a can process approximately 100,000 spectral scene images per second. The spectral scene images can be generated either sequentially or randomly. The tuning system 214 can also simultaneously apply multiple radio frequencies to the acousto-optic tunable filter 212a (via transducer 216), which results in the generation and projection of a compound spectral effect.

Figure 5:
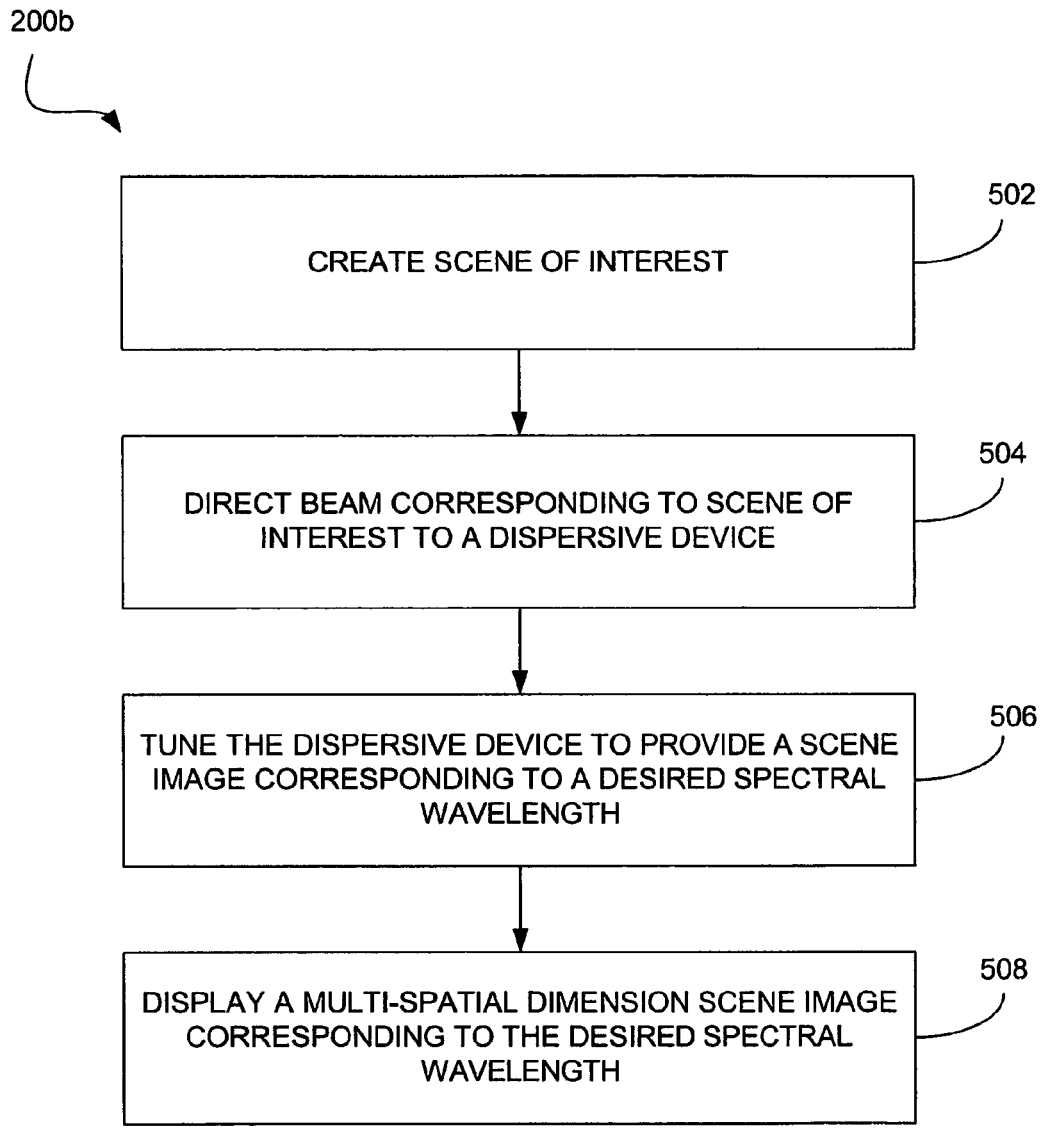
FIG. 5 is a flow diagram that illustrates an embodiment of a hyperspectral scene projection/generation method.

In view of the above description, it will be appreciated that one embodiment of a hyperspectral scene projection/generation method 200b may comprise, as illustrated in FIG. 5, creating a scene of interest (502), directing a beam corresponding to the scene of interest to a dispersive device (504), tuning the dispersive device to cause diffraction of the beam at the desired spectral wavelength (506) (which provides the scene image corresponding to a desired spectral wavelength), and displaying a multi-spatial dimension scene image corresponding to the desired spectral wavelength (508).

Figure 6:
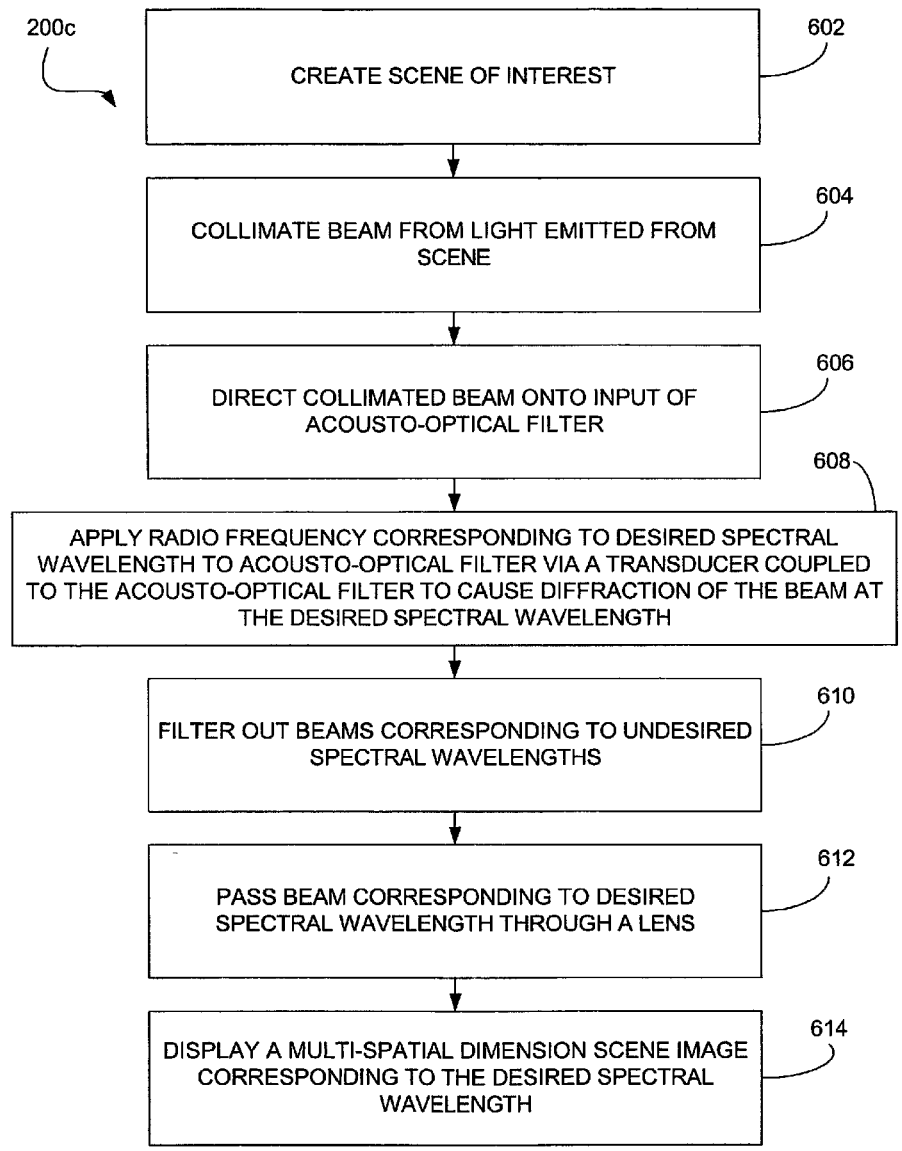
FIG. 6 is a flow diagram that illustrates another embodiment of a hyperspectral scene image projection/generation method.

Another embodiment of a hyperspectral scene projection/generation method 200c may comprise, as illustrated in FIG. 6, creating a scene of interest (602), collimating a beam corresponding to the scene of interest (604), directing the beam to an acousto-optical filter (606), applying an adjustable radio frequency signal corresponding to a desired spectral wavelength to the acousto-optical filter via a transducer coupled to the acousto-optical filter to cause diffraction of the beam at the desired spectral wavelength (608), filtering out beams corresponding to undesired spectral wavelengths (610), passing beams corresponding to the desired spectral wavelength through a lens (612), and displaying a multi-spatial dimension scene image corresponding to the desired spectral wavelength (614).

Figure 7:
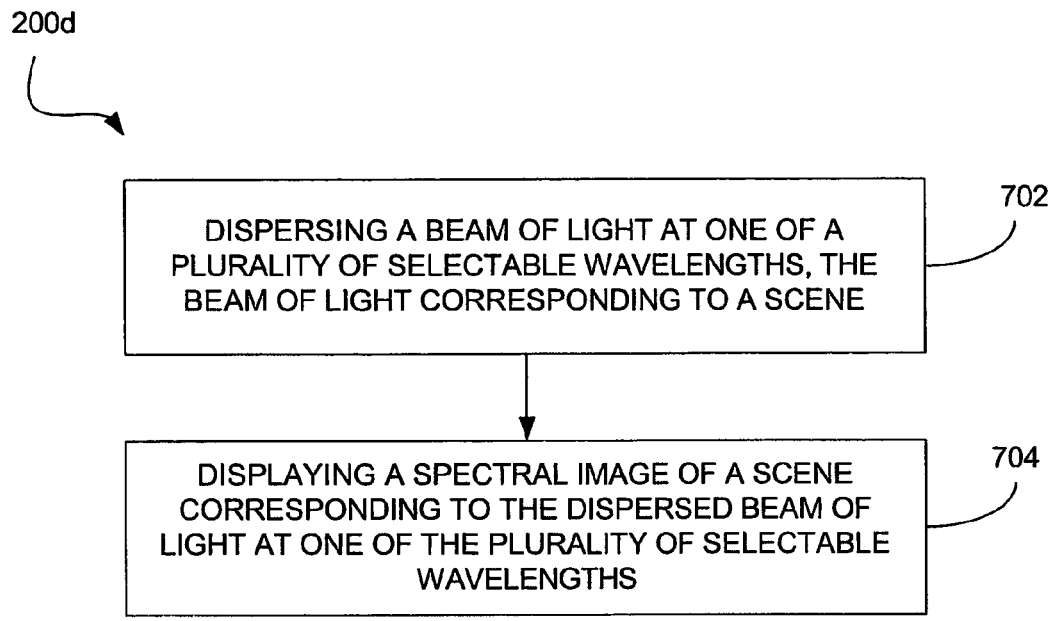
FIG. 7 is a flow diagram that illustrates yet another embodiment of a hyperspectral scene image projection/generation method.

Another embodiment of a hyperspectral scene projection/generation method 200d may comprise, as illustrated in FIG. 7, dispersing a beam of light at one of a plurality of selectable wavelengths, the beam of light comprising a scene (702), and displaying a spectral image of a scene corresponding to the dispersed beam of light at one of the plurality of selectable wavelengths (704).

Any process descriptions or blocks in the flow diagrams as described in FIGS. 5-7 should be understood as representing steps, modules, segments, or portions of code which include one or more executable instructions for implementing specific logical functions or steps in the process, and alternate implementations are included within the scope of the preferred embodiments in which functions may be executed out of order from that shown or discussed, including substantially concurrently or in reverse order, depending on the functionality involved, as would be understood by those reasonably skilled in the art.

It should be emphasized that the above-described embodiments of the present disclosure, particularly, any "preferred" embodiments, are merely possible examples of implementations, merely set forth for a clear understanding of the principles of the disclosed systems and methods. Many variations and modifications may be made to the above-described embodiment(s) without departing substantially from the principles of the systems and methods. All such modifications and variations are intended to be included herein within the scope of this disclosure.

What is claimed is:

1. A hyperspectral scene generation system, comprising:
an image generator for generating broad band light images of scenes from memory;
a tunable dispersive device configured to disperse a beam of light from the image generator at one of a plurality of wavelengths, the beam of light corresponding to a scene; and
a display system configured to display a spectral image of a scene corresponding to the dispersed beam of light at one of the plurality of selectable wavelengths; and
a focusing element adjacent to the display system and a filter disposed between the dispersive device and the focusing element, the filter positioned to enable the dispersed beam corresponding to the spectral image of the scene at one of the plurality of selectable wavelengths to pass through to the focusing element and block out undesired dispersed beams of light corresponding to the scene corresponding to undesired wavelengths.

2. A hyperspectral scene generation system for converting substantially broadband images into selectable spectral images, comprising:
means for storing broadband images of scenes in memory;
means for dispersing an incident beam of light at one of a plurality of selectable wavelengths, the incident beam of light corresponding to a scene generated from memory, the dispersed beam of light corresponding to a spectral image of a scene; and means for displaying the spectral image of the scene at one of the plurality of selectable wavelengths; and means for filtering the dispersed beam of light and means for directing the dispersed and filtered beam of light.

3. The system of claim 2, all limitations of which are hereby incorporated by reference, further comprising means for generating the scene from an image stored in memory at a plurality of wavelengths.

4. A hyperspectral scene generation system comprising:

means for generating a light beam corresponding to a scene at a plurality of wavelengths;

first means for filtering the light beam;

means for electronically selecting at least one wavelength band corresponding to a spectral image of a scene from a plurality of selectable wavelengths;

means for directing the filtered light beam to the means for electronically selecting at least one wavelength band;

second means for filtering the at least one selected wavelength band of light;

means for directing the at least one selected wavelength band of light; and means for displaying the spectral image of the scene.

5. The system of claim 2, all limitations of which are hereby incorporated by reference, further comprising means for tuning the means for dispersing; the means for tuning comprising means for generating a radio frequency signal which is inversely proportional to the selectable wavelength.

6. The system of claim 1, wherein the spectral image of a scene is a hyperspectral image created by photography and used to detect or identify minerals.

7. The system of claim 1 wherein the spectral image of a scene is a hyperspectral terrestrial image used to detect terrestrial vegetation.

8. The system of claim 1 wherein the spectral image of a scene is a hyperspectral terrestrial image used to detect man-made materials.

9. The system of claim 2, wherein the spectral image of a scene is a hyperspectral image used to detect or identify minerals.

10. The system of claim 2 wherein the spectral image of a scene is a hyperspectral terrestrial image used to detect terrestrial vegetation.

11. The system of claim 2 wherein the spectral image of a scene is a hyperspectral terrestrial image used to detect man-made materials.

12. The system of claim 1 wherein the image generator comprises multiple pixel source elements for emitting broadband light signals.

13. The system of claim 12 wherein the multiple pixel source elements comprise an array of LEDs which generate two-dimensional broadband pixellated scenes, and wherein the intensity of each pixel can be individually adjusted using a processor.

14. The system of claim 1 wherein the filter is an aperture and the focusing element is a lens.

15. The system of claim 4 wherein the means for electronically selecting at least one wavelength band from a plurality of selectable wavelengths comprises a tuner and a transducer, the tuner providing an adjustable radio frequency (RF) signal to the transducer which converts the RF signal to sound waves and the sound waves cause dispersion of the light beam.

16. The system of claim 4 wherein the means for electronically selecting at least one wavelength band from a plurality of selectable wavelengths comprises means for selecting at least two wavelength bands.

17. The system of claim 4 wherein the means for electronically selecting at least one wavelength band from a plurality of selectable wavelengths can provide multiple spectral frames per second.

18. The system of claim 4 wherein means for electronically selecting at least one wavelength band outputs a polarized beam of light.

* * * * *